United States Patent [19]

Kaplan et al.

[11] Patent Number: 5,157,718
[45] Date of Patent: Oct. 20, 1992

[54] INTERFACE ADAPTER PERMITTING TOPS POSITION TO FUNCTION AS DIRECTORY ASSISTANCE UNIT

[76] Inventors: Murray Kaplan, 27 W. Split Rock Dr.; Jeffrey R. Segal, 1680 Blue Jay La., both of Cherry Hill, N.J. 08003

[21] Appl. No.: 443,116

[22] Filed: Nov. 29, 1989

[51] Int. Cl.⁵ .......................................... H04M 3/60
[52] U.S. Cl. .................................. 379/218; 379/223; 379/261
[58] Field of Search ............... 379/218, 222, 223, 260, 379/261

[56] References Cited

U.S. PATENT DOCUMENTS

| | | | |
|---|---|---|---|
| 4,653,085 | 3/1987 | Chan et al. | 379/213 X |
| 4,776,004 | 10/1988 | Baver et al. | 379/223 X |
| 4,797,910 | 1/1989 | Davdelin | 379/223 X |

OTHER PUBLICATIONS

Hallman, et al., "Dial O for your telephone company operator-again" Bell Communications Research Exchange Jan.-Feb. 1987, pp. 23-27.

*Primary Examiner*—James L. Dwyer

[57] ABSTRACT

An interface adapter is disclosed for utilization with a conventional toll operator position system having a keyboard, video display and controller which interface adapter interface with the TOPS position and external data bases and audio response units in a manner to permit the TOPS position to additionally perform such functions as directory assistance, order entry and line message delivery. The interface adapter includes first and second switching means to intercept the keyboard and video data paths of the TOPS position to isolate the controller and includes a control processor in communication with the external data bases and audio response units which is programmed to respond upon command from the keyboard to access the external data bases and audio response units as required and to communicate such data or audio response to the appropriate terminus.

4 Claims, 2 Drawing Sheets

INTERFACE ADAPTER PERMITTING TOPS POSITION TO FUNCTION AS DIRECTORY ASSISTANCE UNIT

BACKGROUND OF INVENTION

The present invention is concerned with telephone communication equipment and, more particularly, to an interface adapter permitting a toll operator position system which functions as a toll and operator assistance unit to also serve a dual function such as a directory assistance unit in communication with remote data bases and audio response units.

Prior to the breakup of the local toll telephone companies, the local telephone companies operated toll and operator assistance equipment manufactured by Northern Telecom known as toll operator position system or TOPS. This TOPS equipment utilized a controller operating in conjunction with a video display and keyboard and is in audio communication through the controller to an operator working at the keyboard and the video display. The controller is on line to the central office through a switching network in the central office to the customer. The switching network is of the type manufactured by Northern Telecom known as the DMS 200.

The TOPS positions were used exclusively for toll and operator assisted calls. The TOPS positions had no ability to access external data bases such as those used for directory assistance or audio response units associated with such data bases.

At positions remote to the TOPS positions, whether in an adjoining room in the local office or at other locations, were the separate group of operators and equipment providing directory assistance. The directory assistance equipment provided the telephone communications aspects of communication to primary data bases and other data bases and also to audio response units. Typically, these directory assistance operators, whether locally or at remote distances in other states and cites, would provide the caller with the number of a desired party. The manner of providing this number could be directly by the operator's voice communication from reading the number from a video display or through interconnection with an audio response unit which, through a digital to analog converter, provided the number automatically to the telephone company patron. Only in rare instances is the directory assistance operator capable of directly placing the call for the calling patron.

The directory assistance operators also rarely have the capability of providing other services from other data bases such as interconnection with the business office and its data bases or providing ordering of service and repair.

With the advent of the breakup of the telephone companies, the independent interexchange carriers assumed the responsibility for the placement of long distance toll calls and other toll operator assistance. The result of this was that a great portion of the TOPS equipment positioned in the local telephone companies no longer was needed resulting in a costly disutilization of very expensive equipment. Additionally, many personnel at the TOPS positions were left idle.

Accordingly, following the telephone company breakup, a need has arisen to maximize the utilization of the idle TOPS positions. However, the TOPS positions and the equipment utilized in the directory assistance functions of the telephone companies operate on different signal protocol. Accordingly, direct interconnection of a TOPS position to the external data bases and audio response units is not possible.

The problem encountered is the maximization of the utilization of the TOPS positions to continue to provide toll and operator assistance while also adding the additional capabilities of directory assistance, order entry and other operator services. It is this problem to which the present invention is directed and the solution provided through the TOPS interface adapter.

SUMMARY OF INVENTION

In accordance with the present invention, a conventional TOPS position is utilized to provide both the normal TOPS position functions of toll and operator assistance in one mode and, through a TOPS interface adapter, to be capable of operating in a second mode to provide access to remote data bases to be capable of providing such additional operator services such as directory assistance and order entry.

A typical TOPS position includes a controller, keyboard and video display which receives and communicates data through a DMS 200 at the central office. The controller includes an audio path for audio communication between the customer and the operator. Additionally, there is a keyboard data path between the keyboard and controller and a video data path between the video display and controller in the conventional TOPS position. In normal TOPS mode, these paths are left unaltered.

In accordance with the present invention, a first switching means is provided which intercepts the keyboard data path and there is provided a second switching means which intercepts the video data path.

A control processor is provided which is in communication with the external data bases and audio response units. The control processor is programmed to respond upon command from the keyboard to switch into the data access mode by intercepting the keyboard data path and the video data path.

The control processor is programmed to receive keyboard data which is passed on to the external data bases and audio response units and likewise programmed to receive responses from the external data bases in accordance with their protocol or signal format and to display such data on the video display and/or to activate the audio response unit which, through a digital to analog converter, passes the audio response on to the customer. If required, the TOPS operator may command the TOPS interface adapter to also place the call for the patron.

The control processor is also programmed such that, upon completion of the function of the interface adapter operating in the data access mode, the TOPS position will be returned to its normal function as a toll and operator assistance position.

DETAILED DESCRIPTION OF INVENTION

Figure 1:
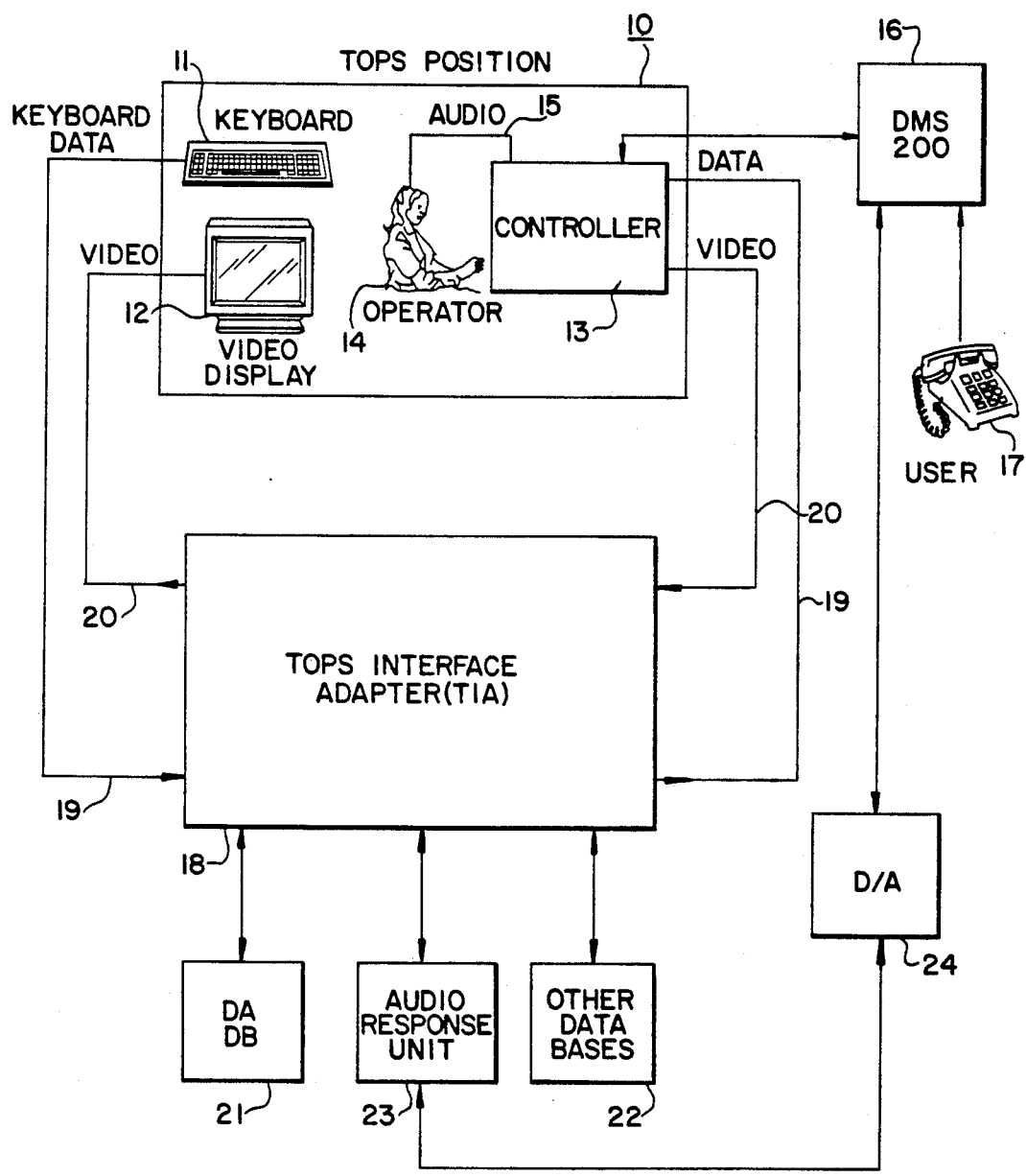
FIG. 1 is a block diagram of a typical TOPS position in communication with a central office and as interconnected with the TOPS interface adapter of the present invention.

FIG. 1 of the drawings illustrates in block diagram a typical telephone communications system utilizing a conventional TOPS position and the manner in which the TOPS interface adapter of the present invention is employed. A typical TOPS position 10 employs a keyboard 11, video display 12 and a controller 13. An operator 14 is positioned at the TOPS position and is in communication with an audio path 15 from the controller.

The TOPS position, being one of many, is located at a local telephone company. The TOPS position is interconnected to a central office switching network 16 such as a DMS 200. In turn, a local subscriber utilizing a telephone 17 is interconnected to the switching network 16.

In normal operation, the local subscriber utilizing his telephone 17 interacts through the switching network 16 to the TOPS position 10. In a normal environment, the subscriber will be in communication with the operator at the TOPS position to place a toll call or other operator assisted call.

If the subscriber through the phone 17 desires directory assistance or other assistance such as service or repair, then the switching network 16 will direct the call to another operator which heretofore has provided directory assistance. This operator is not shown in FIG. 1 but such equipment is of a conventional nature.

In accordance with the present invention, a TOPS interface adapter 18 is provided. As hereinafter to be described in detail, in normal usage the TOPS keyboard data path 19 and video data path 20 pass through the TOPS interface adapter 18 and function in the normal manner.

In accordance with the present invention and as to be described hereinafter, upon the entry of an appropriate key stroke on the keyboard 11 representing a request for directory assistance, the TOPS interface adapter is activated and the external data base 21, other data bases 22 and audio response unit 23 is accessed and placed on line with the keyboard 11 and video display 12.

When the TOPS interface adapter 18 is switched to the data base access mode, the TOPS keyboard is used as an alpha numeric keyboard that communicates with the selected data base and audio response unit. In a like manner, the video display receives and displays information from the various data bases.

In operation, the TOPS interface adapter also has the ability to automatically route a call by sending commands through the TOPS controller and to the DMS 200. Further, the TOPS interface adapter has the ability to transfer the calling customer to an audio response unit 23 whereupon the audio response unit 23, through a digital to analog converter 24 via the DMS 200, recites the number associated with the selected listing.

Figure 2:
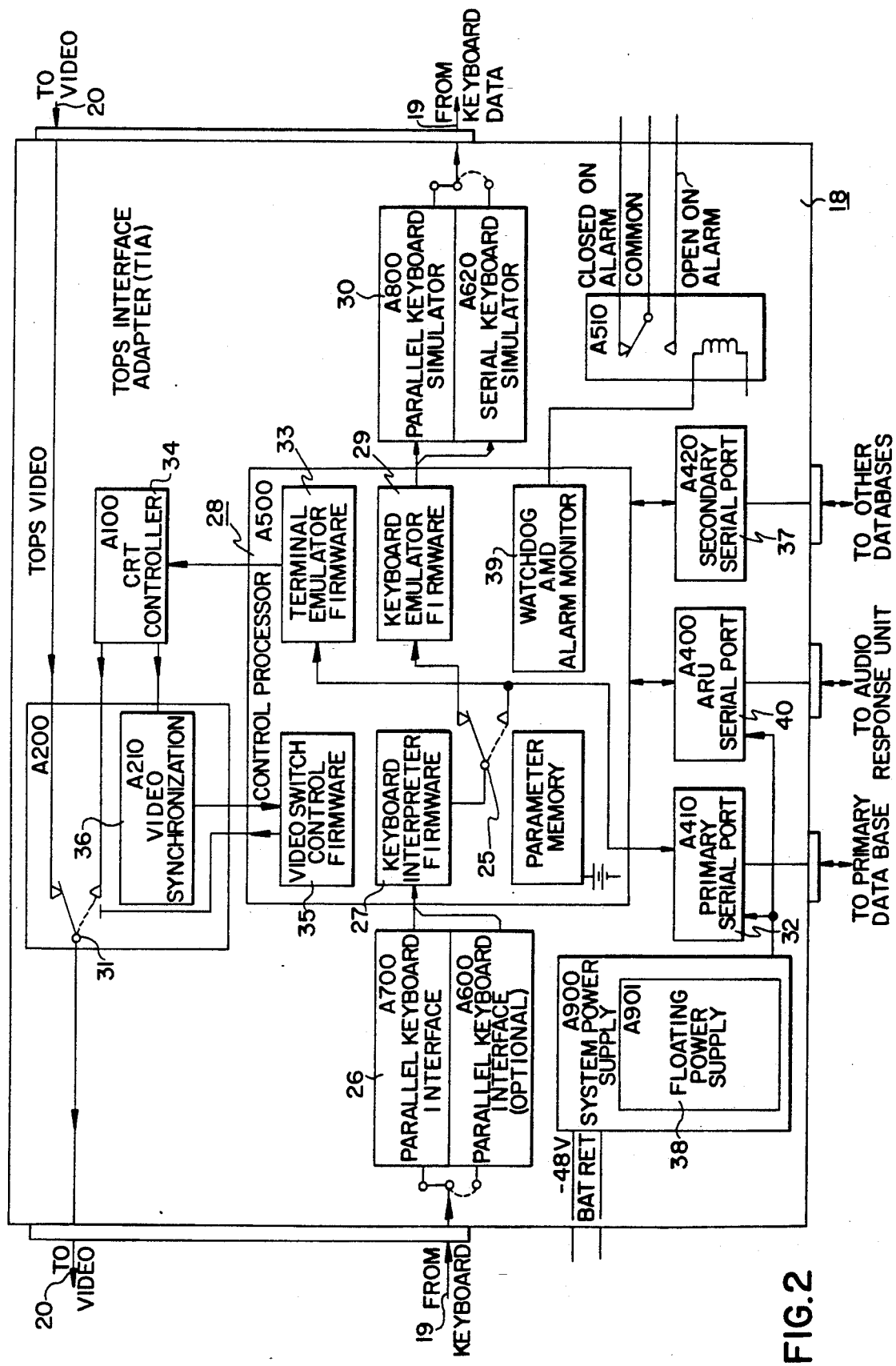
FIG. 2 is a block diagram of the TOPS interface adapter of the present invention shown in broad block form in FIG. 1.

A basic block diagram of the TOPS interface adapter 18 of the present invention is illustrated in FIG. 2 of the drawings. In the TOPS mode, the keyboard data path 19 passes directly through the TOPS interface adapter 18 by means of a first switch 25 as shown in FIG. 2. The signals upon the keyboard data path 19, for purposes of code compatability, pass through an optional parallel or serial keyboard interface 26, keyboard interpreter firmware 27 within a control processor 28, keyboard emulator firmware 29 and finally a parallel-serial alternate keyboard simulator 30. In this manner, the keyboard 11 of the TOPS position is interconnected to the controller 13 of the TOPS position and functions in the normal TOPS mode.

In a like manner, the video data path 20 passes directly through the TOPS interface adapter 18 through a second switch 31. Again, the video data path between the TOPS controller 13 and the video display 12 operates in the normal TOPS mode.

In accordance with the present invention, the control processor 28 is programmed such that, upon the entry of a keyboard key stroke of one of the TOPS keys not normally used, the TOPS interface adapter 18 will switch into the data access mode. This signal appearing upon the keyboard data path 19 will cause the first switch 25 to switch to the data access mode, figuratively illustrated by the position of the switch 25 shown in phantom in FIG. 2. In a like manner, the second switch 31, figuratively illustrated in FIG. 2, is switched to the phantom mode as shown in FIG. 2.

In the data access mode, the operator 14 at the TOPS position 10 is in audio communication with the calling customer. Depending upon the request of the customer, the operator 14 will enter upon the keyboard 11 the appropriate data request. The code from the keyboard 11 will be transmitted over the keyboard data path 19 through the first switch 25 and through a primary serial port 32 to either the primary data base 21 or other data bases 22 illustrated in FIG. 1 in block diagram. The code from the keyboard 11 will command the selected data base to provide the requested information which will be returned to the control processor through the normal telephone communication channels.

In a typical environment, the code returned from the selected data base will pass through the control processor 28 wherein terminal emulator firmware 33 will provide appropriate code conversion for a CRT controller 34 and pass by the second switch 31 to the video to display the requested data such as a selected telephone number. At this point, the operator 14 at the TOPS position 10 may advise the customer of the selected number. Additionally, the operator at the TOPS position may proceed to place the call through the TOPS controller via the DMS 200 in a conventional manner or automatically place the call through special features of the TOPS interface adapter of the present invention.

The control processor 28 includes video switch control firmware working in conjunction with video synchronization circuitry 36 to control synchronization of the video display.

The control processor 28 may also operate via a secondary serial port 37 to other data bases. For example, the TOPS operator, through the TOPS interface adapter, may, via these other data bases, access business office records or make requests for service or repair and the like.

The keyboard 11, via the data path 19 and first switch 25 through the control processor, also has the capability of accessing, via a serial port 40, an audio response unit 23 shown diagrammatically in FIG. 1. The audio response unit 23 is of the normal and conventional configuration and is located in the normal and conventional location, i.e. a central office or other remote location.

The code entered upon the keyboard 11 passing via the second switch 25 through the control processor will command the audio response unit 23 which, operating in the normal and conventional manner, and as illustrated diagrammatically in FIG. 1, will generate the appropriate audio response for the requested listed number which will be placed upon the telephone communications system via a digital to analog converter 24 through the DMS 200 and ultimately to the customer to thus provide the requested listing all in a conventional manner.

The TOPS interface adapter, through the program in the control processor 28, is programmed such that, upon completion of its function, i.e. either the operator 14 audibly announcing the requested number to the calling customer, placing of the call for the customer or the activation of the audio response unit, will automatically return to the normal TOPS mode.

The TOPS interface adapter 18 includes a system power supply 38. The power supply 38 provides the normal power for the various components of the interface adapter including the control processor.

The TOPS interface adapter 18 also includes a watchdog and alarm monitor circuitry to automatically indicate proper operation of internal circuitry and firmware.

While the interface adapter of the present invention has been described in use with the Northern Telecom traffic operator position system (TOPS) and its companion switching network (DMS 200), the interface adapter may be used with other operator positions and companion switching networks such as AT&T's comparable equipment of TSPS operator position and ESS switching network.

The TOPS interface adapter of the present invention has been described in respect to a particular embodiment thereof set forth in the specification and as illustrated in the drawings. Other variations and modifications of the concept of the invention will thus become apparent to those skilled in the art by reason of the foregoing description of a specific embodiment thereof and, accordingly, no limitation as to the scope of the invention is intended by reason of the disclosure of a specific embodiment but the scope of the invention is to be interpreted in view of the appended claims.

What is claimed is:

1. In a telephone communications system employing a traffic operator system having a keyboard, video display, controller, a keyboard data path between the keyboard and controller and a video signal path between the video and controller providing toll and local operator assistance and equipment including external data bases and audio response units to provide services including directory assistance, the improvements of an interface adapter permitting utilization of the operator system for the dual function of handling normal operator traffic while providing additional access to external data bases and audio response units to provide services including directory assistance comprising:

first switching means to intercept the keyboard data path;

second switching means to intercept the video data path; and data processing means in communication with the external data bases and audio response units and programmed to respond upon command from the keyboard to access the external data bases and audio response units as requested and to display and communicate such data or audio response to the appropriate terminus.

2. The telephone communications system of claim 1 wherein the data processing means includes terminal emulator firmware for receipt of data from remote data bases to convert the data for video display of the data base information so received.

3. The telephone communications system of claim 1 wherein the data processing means includes keyboard interpreter firmware to receive and interpret keyboard data for direction and control of the data processing means.

4. The telephone communications system of claim 3 wherein the data processing means further includes keyboard emulator firmware in communication with the keyboard interpreter firmware for reconstruction of the keyboard data for communication to the controller.

* * * * *